United States Patent
Gutti et al.

(10) Patent No.: US 7,512,768 B2
(45) Date of Patent: Mar. 31, 2009

(54) DYNAMICALLY SHARING A STACK BETWEEN DIFFERENT CODE SEGMENTS

(75) Inventors: Subhash Gutti, Los Angeles, CA (US); Uday Savagaonkar, Beaverton, OR (US); Ravi Sahita, Beaverton, OR (US); David Durham, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 11/490,824

(22) Filed: Jul. 21, 2006

(65) Prior Publication Data
US 2008/0022065 A1    Jan. 24, 2008

(51) Int. Cl.
G06F 12/00 (2006.01)
G06F 13/00 (2006.01)
G06F 13/28 (2006.01)
G06F 9/26 (2006.01)
G06F 9/34 (2006.01)

(52) U.S. Cl. .................. 711/170; 711/154; 711/163; 711/206

(58) Field of Classification Search .................. 711/170
See application file for complete search history.

(56) References Cited

U.S. PATENT DOCUMENTS

| 2002/0147899 A1* | 10/2002 | Lewis | 711/170 |
| 2003/0023824 A1* | 1/2003 | Wooldridge | 711/170 |
| 2007/0156999 A1* | 7/2007 | Durham et al. | 711/170 |
| 2007/0157003 A1* | 7/2007 | Durham et al. | 711/206 |

OTHER PUBLICATIONS

Intel Corporation, "Execute Disable Bit Functionality Blocks Malware Code Execution," Jun. 24, 2004, pp. 1-14.
U.S. Appl. No. 11/323,446, filed Dec. 30, 2005, entitled "Page Coloring To Associate Memory Pages With Programs" by David M. Durham, et al.

* cited by examiner

Primary Examiner—Kevin L Ellis
Assistant Examiner—Ryan Bertram
(74) Attorney, Agent, or Firm—Trop, Pruner & Hu, P.C.

(57) ABSTRACT

In one embodiment, the present invention includes a method for receiving a request from a caller code portion of a first color to color at least a portion of a stack with a second color, determining if the request is valid, and if so remapping the stack portion from a first mapping colored with the first color to a second mapping colored with the second color. Other embodiments are described and claimed.

25 Claims, 3 Drawing Sheets

DYNAMICALLY SHARING A STACK BETWEEN DIFFERENT CODE SEGMENTS

BACKGROUND

Embodiments of the present invention are directed to computer systems, and more particularly to protecting access to memory regions.

Memory-based attacks are a threat to the security of computer systems. Certain attacks involve storing malicious code such as a virus or a worm in the memory of a system, and then exploiting bugs and/or buffer overflows while running legitimate programs to transfer control to the malicious code. One approach to preventing this type of attack is to include an "execute disable" bit in a page table entry that may be used to designate pages where data is stored as non-executable, so that malicious code cannot be stored and subsequently executed from such memory spaces. However, memory based-attacks are becoming increasingly sophisticated, and additional approaches to preventing such attacks are needed. This includes protection from buffer overflows that execute existing code or corrupt memory, malicious kernel or application components, root-kits, spyware, and computer viruses.

Various protection measures exist in today's systems. For example, processes can be separated into user level processes and system level processes. These processes operate at different privilege levels and accordingly provide some measure of protection. However, these and other protection measures are implemented at a high level and provide for only coarse-grained protection, as these measures operate at process level and do not provide protection at finer grains such as at memory region levels, (e.g., at memory page level), or protect portions of processes from each other. At the same time, the various protection measures can raise complexity and impede the progress of efficient operation.

DETAILED DESCRIPTION

Figure 1:
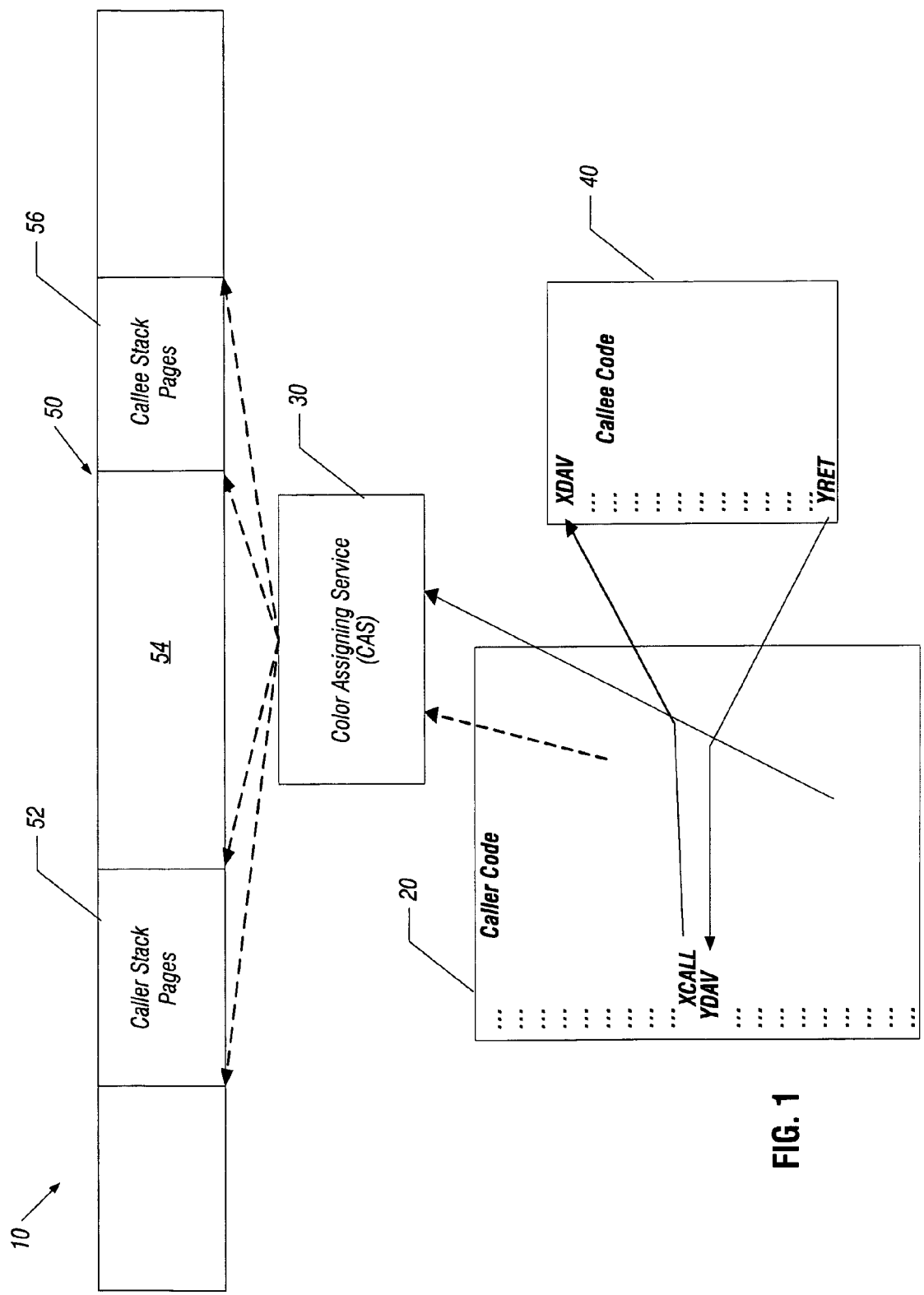
FIG. 1 is a block diagram of an architectural overview of an embodiment of the present invention.

In various embodiments, memory regions, e.g., memory pages, may be associated with programs and their associated data via an attribute system. In the embodiments described herein, the attributes may be referred to as a page "color," although it is to be understood that other attributes may be used. This coloring technique may be used to logically partition memory at a granularity fine enough to prevent one program from accessing the memory space of another program, or to even prevent parts of a single program from accessing the memory space of other parts. Various embodiments may be implemented within page-based memory management data structures or nested page-based memory management data structures used by virtualization technologies.

In one embodiment, a translation unit of a processor may receive a linear address of an instruction. The translation unit may perform address translations, for example, translating a logical or linear address to a physical address according to various page-based memory management techniques. At least a portion of the linear address is used to index into hierarchical tables including page tables. The page tables contain entries, each including a field for a base address of a page in memory, for example, bits 39:12 of a page table entry (PTE) in an Intel® Architecture (IA-32) system using Extended Memory 64 Technology (EM64T). Note however, that embodiments may implement various page sizes and may be used in other architected systems.

Next, a page color of the accessed page may be compared to the page color of the page containing the instruction that provided the linear address. In various embodiments, the page color may be an attribute of a page represented by a value stored by a PTE. For example, a page color may be represented by an eight bit field in a page table entry, for example, bits 47:40 of a PTE in an EM64T system. Thus a color value for a page may be any one of 256 values in this example.

In different embodiments, an operating system (OS) or other supervisor program may assign a first page color to pages from one program that it loads into memory, and a different page color to pages from another program that it loads into memory, and so on, such that one program may not access pages associated with another program, even if both programs reside within the same linear or logical address space. Further, different page colors may also be assigned to different parts of a single program, such that critical program components or data structures may only be accessed using special function calls or through specific entry points.

To aid in cooperation of different programs, accesses from a first program to a second program may be allowed according to various criteria. For example, one color value (e.g., 0x00) may represent no color, such that a page marked with no color is accessible by any other page. Thus legacy applications can run in a page-colored environment as uncolored pages. Although unable to access colored pages, such legacy applications can access system services, which may be colored with a special color (e.g., 0xFF).

A page table entry may further include a field or bit, such as bit 48 of a PTE in an EM64T system to determine whether the page is hidden based on its color. The bit may be set to zero, for example, to allow any other page to read from the referenced page, regardless of the result of a color comparison, or set to one to enable accesses based on the color comparison. In various implementations, if the hidden bit is set, only pages having the same color can access the requested page.

Inter-color transitions may be allowed based on instruction control flow. For example, a jump or other control flow instruction to pass control from a page of a first color to a specific location (e.g., entry point) of a second color may be allowed. In one embodiment, a directed address vector (XDAV) instruction may allow the transition to occur if control passes to a XDAV instruction in a newly colored page. In this way, entry into a program is allowed only at an expected point which may provide a defined and secure interface, while preventing jumps to random or unexpected sections of a program from a differently colored program. The XDAV instruction may also use a variable parameter to perform a color comparison to determine if a program of an expected color is attempting to access the program implementing the XDAV identified entry point. In some embodiments, the XDAV instruction may only be executed in pages that are executable (e.g., not eXecute Disabled using the XD bit), assuring that data pages with spurious bit sequences appearing to be a XDAV instruction will not be executed by the processor. As will be discussed further below, additional inter-color transition instructions may be used to call code of another color and return therefrom.

In some embodiments, a processor may include a register or other storage location to support inter-color transitions. In one embodiment, this register may be referred to as a previous page color (PPC) register. Specifically, when an allowed transition occurs, the previous page color is stored in the PPC register. Then, instructions from the new page may query the PPC register to determine the previous page color, so that programs may control access to their services by determining which programs of differing colors are allowed access. Note that transitions caused by a supervisor such as an OS or other supervisor-type program may not be stored in the PPC register.

In various embodiments, function calls by a caller function to a callee function may provide for sharing of a common stack between functions having code pages of different colors. That is, a caller function and a callee function may be colored with different colors to logically partition the code for these different functions. Using embodiments of the present invention, colored pages of a stack that are associated with a calling function may be dynamically shareable by differently colored pages of the callee function.

In various implementations, caller code can make a call into callee code having a different color. Furthermore, after execution of a desired operation in the callee code, control may return back to the calling code, although these functions are of different colors. Still further, the caller and the callee can share stack memory, even where the stack memory is colored. In this way, processes may safely call functions such as application programming interfaces (APIs) and library calls (e.g., dynamically linked libraries (DLLs)) across different colors.

Referring now to FIG. 1, shown is a block diagram of an architectural overview of an embodiment of the present invention. As shown in FIG. 1, a system 10 may include caller code 20, which may be code of a process that performs various functions. Caller code 20 (also referred to herein as a "caller") further represents code that seeks to make an inter-color function call. For purposes of discussion, it may be assumed that caller code 20 is a color-protected module and all pages belonging to it (including stack pages) have a unique color. During execution of the code, another code portion, namely callee code 40 may be called. Callee code 40 (also referred to herein as a "callee") represents code that is to be called from caller code 20. For purposes of discussion, it may be assumed that callee code 40 has a different color than that of caller code 20.

In the embodiment of FIG. 1, caller code 20 may make an inter-color function call to call callee code 40. When caller code 20 and callee code 40 are of different colors, prior to the actual function call to callee code 40, caller code 20 may execute code to request a color assigning service (CAS) 30 to take action to effect the color transition (as represented by the dashed arrow from caller code 20 to CAS 30 above the XCALL instruction). CAS 30 may be responsible for assigning color to various PTE's. While described as being part of the OS, the scope of the present invention is not limited in this regard, and in other embodiments CAS 30 may be situated elsewhere. In various embodiments, CAS 30 may be colored in a special color that allows it to access any colored page and assign color by accessing PTEs. Note that in such embodiments, any transition happening from CAS 30 is not recorded in the PPC register, thus removing any need to have a XDAV instruction within the requesting (i.e., caller) code. In yet another embodiment, CAS 30 may be implemented as a part of a virtual machine monitor (VMM) on a virtualization-enabled system.

As shown in FIG. 1 CAS 30 interacts with a linear address space 50. Address space 50 includes caller stack pages 52, which may be colored the same as the color of caller code 20. The stack pages are the memory region where local state of the executing process is stored. This region is to be protected from being accessed by other memory components. At the same time, components executing in the same program context (i.e., process) should be able to access the stack pages. Thus, CAS 30 may create newly mapped stack pages for callee code 40. These callee stack pages 56 may be at a newly mapped linear address with respect to caller stack pages 52. In various embodiments, the process in which caller code 20 executes may be located in a linear address space 54 existing between caller stack pages 52 and callee stack pages 56.

Depending on desired operation, CAS 30 may perform remapping of stack pages such that both caller 20 and callee 40 may access the pages. Accordingly, the stack pages may be dynamically shared during the time callee code 40 is executing. To enable caller 20 and callee 40 to both access the remapped stack pages, CAS 30 may create a separate virtual mapping for stack pages 56 that is colored in the color of callee 40. If such dynamic sharing is not to be permitted, this virtual mapping is not made. Instead, the mapping of stack pages 52 itself is modified to have the color of callee 40. Note that, in either of these embodiments, the underlying physical memory pages represented by these various mappings are the same.

Various inter-color transition instructions may be executed both in caller code 20 and callee code 40 to enable the inter-color transition and allow for dynamic sharing of stack pages between these functions of different colors. At the conclusion of callee code 40, an inter-color return instruction may be executed that allows control flow to return back to caller code 20. After verifying a proper return, code within caller code 20 may request CAS 30 to unmap callee stack pages 56 (as represented by the solid arrow from caller code 20 to CAS 30 in FIG. 1). While shown with this particular implementation in the embodiment of FIG. 1, it is to be understood that the scope of the present invention is not limited in this regard.

In various embodiments, multiple instructions may be present to support inter-color transitions and dynamic stack sharing. In one embodiment, an inter-color calling instruction, referred to herein as XCALL, may be used when an inter-color function is to be called by a caller function. This instruction may cause replacement of the processor's stack pointer (PSP) with the stack pointer of the newly mapped callee's stack and may further push the current page color (PCPC) onto the stack. In one embodiment, this instruction may take in three parameters: the address of the callee entry point; the color of the callee; and return information (i.e., information used to reinstate the caller's state). Such return information may include the caller's stack pointers which may correspond to the linear difference (LD) between caller and callee.

In certain implementations, prior to executing the XCALL instruction, CAS 30 may perform prerequisite operations. These operations may include, in one embodiment, checking if there are any recursive or suspicious requests for the remapping request; locating some unreserved free linear address space to accommodate the address size of current stack pointer and base pointer (ESP-EBP); mapping page frames of the stack containing linear addresses from EBP to ESP to new linear addresses and coloring them with the color of the callee; and calculating the linear difference between the old ESP linear address and newly mapped ESP linear address. Upon completion of these prerequisites, CAS 30 may call the XCALL instruction of the caller with the following parameters: the address of the function to be called; the difference between the linear addresses of the old and newly mapped pages (LD=OldStackpage linear address−NewStackpage linear address); and the color of the callee code (CCC).

Upon receipt of these parameters, the XCALL instruction may perform the following: push various parameters onto the stack including the LD in the stack addresses, the CCC, the next instruction pointer (EIP) in the caller's code onto the stack (RIP), the current ESP (PESP), the current code color (PCPC); and replace various pointers including replacing the ESP register with a new ESP (NESP (=ESP+LD)), replacing the EBP register with a new EBT (NEBP (=EBP+LD)), and replace the EIP with the linear address of the callee.

The XDAV instruction may be the entry point to a differently colored callee function. This instruction may verify that the previous instruction was the XCALL instruction. Further, the instruction checks that the color placed on the stack is the color in the PPC register to verify that the operation is a valid color transition. Failing either of the checks may cause generation of a color-violation (CV) exception. More specifically, in one embodiment, the XDAV instruction may perform the following: pop the PCPC from the stack pointed to by the changed ESP value (NESP); check that the PCPC from the stack is same as that in PPC register; and check that the previous instruction is XCALL. Note if the PCPC and the PPC register values do not match, the XDAV may set a CV bit in the page fault error codes to generate a color-violation exception, and cause a page-fault exception. If the previous instruction is not the XCALL instruction a general exception fault may be raised. After the XDAV instruction executes successfully, the callee may start executing.

Yet another instruction may be used to return to the caller function from the callee function. In various embodiments, an inter-color return instruction (YRET) may be the return instruction from the callee. This instruction provides for replacement of the caller's stack pointer information, e.g., based on information pushed onto the stack by the XCALL instruction. In one embodiment, the YRET instruction may perform the following: pop the PESP from the stack and place it in the ESP register; pop the RIP from the stack and place it in the EIP register; and return to the next instruction, now in the EIP.

In the caller, control may return to an inter-color verification instruction, referred to herein as YDAV, which may be used to check for the proper color transition based on the PPC color and the color stored on the stack. Failure to return to the YDAV instruction may cause a general exception, in some embodiments. In one embodiment, the YDAV instruction may perform the following: pop the CCC from the stack and compare it against the PPC register; pop the caller's stack pointer, PESP and PEBP into ESP and EBP registers respectively; and pop the LD into a temporary register. Note that if the CCC and the PPC register values do not match, a color violation exception may be raised. Upon successful return, the caller may request the OS to unmap all the pages colored with the callee's color falling between NEBP (calculated as ESP) and NESP, as these pages are no longer required.

Figure 2:
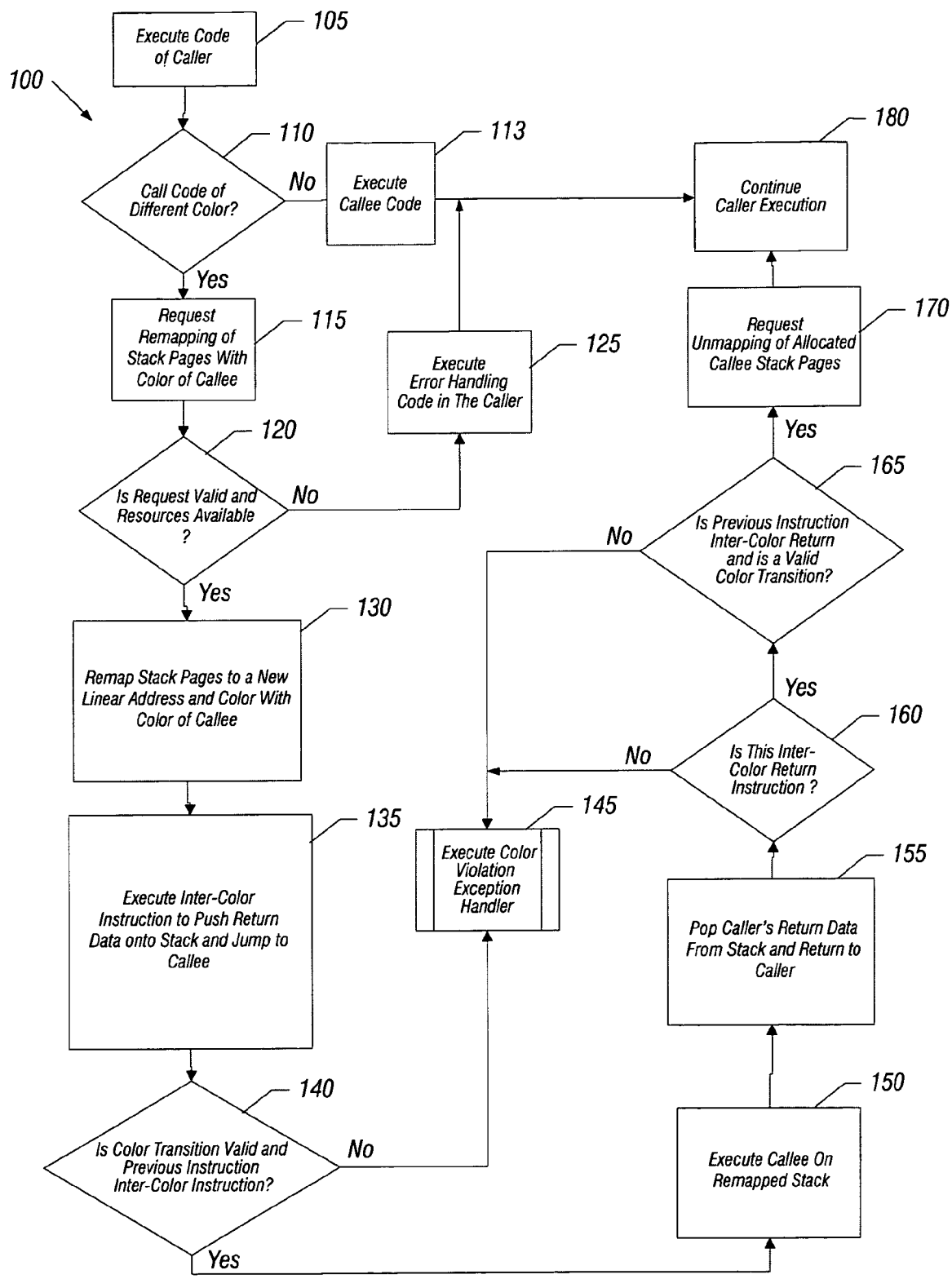
FIG. 2 is a flow diagram of a method in accordance with one embodiment of the present invention.

Many different manners of implementing inter-color transitions between a calling function and a callee function may be realized. Referring now to FIG. 2, shown is a flow diagram of a method in accordance with one embodiment of the present invention. As shown in FIG. 2, method 100 may be used to handle operations on a stack in a page colored environment. Method 100 may begin by executing code of a caller function (i.e., a caller) (block 105). For purposes of discussion herein, assume that the caller code is colored green. Accordingly, all stack pages may initially be colored in green. From block 105 control passes to diamond 110. There, it may be determined whether code of a different color is called (diamond 110). If not, then the call may be handled via execution of callee code (block 113), and then execution of the caller continues (block 180).

If instead at diamond 110 it is determined that the caller seeks to call code of a different color, control passes to block 115. There, the caller code may request remapping of stack pages with the color of the callee code (block 115). More specifically, the caller code may request a CAS module (or other supervisor program) to map the physical page frame in which the current stack resides to a different location in the linear address space of the process. Furthermore, the caller code may request the CAS module to color the PTEs with the color of the callee code. Assume for purposes of the embodiment of FIG. 2 that the callee code has a color of orange.

At diamond 120, it may be determined whether the request is a valid request and sufficient resources (e.g., free page table entries (PTEs)) are available to perform the request (diamond 120). More specifically, the CAS module may process the request. If the request is not valid or resources are unavailable, control passes to block 125, where error handling code in the caller may be executed (block 125). From there, control passes to block 180, discussed above.

If instead the CAS module determines that the request is valid and sufficient resources exist, control passes from diamond 120 to block 130. At block 130, stack pages may be remapped to a new linear address and colored with the color associated with the callee function (e.g., orange). Specifically, all pages containing data (including parameters to be passed to the calling function and color-transition validation data) to be used by the callee function may be remapped to a new linear address space. Furthermore, these pages may be colored with the color of the callee function. When these prerequisite actions have been completed, control passes from block 130 to block 135.

At block 135, the caller code may execute an inter-color instruction. This instruction may push return data onto the stack and cause control to jump to the callee code. The return data includes data to be used to return to the caller state after callee execution. Such information may include, for example, a return instruction pointer, a current stack pointer, a current page color among other such data. Furthermore, a current stack pointer and a linear address difference between the caller stack pages and the callee stack pages may be pushed into the stack. The current stack pointer and base pointer of the processor may be replaced with the values for the newly mapped stack pages. In various embodiments, these activities may be performed responsive to an XCALL instruction.

From block 135, control passes to diamond 140. At diamond 140, it may be determined whether the color transition is valid and whether the previous instruction executed was an inter-color transition instruction (diamond 140). In various embodiments, diamond 140 may be implemented in the callee code via an XDAV instruction. This color-validation instruction, XDAV, may check to determine whether the color transition is valid and allowed. The instruction may furthermore check to determine if the previous instruction (i.e., executed in the caller function) was the inter-color transition call, XCALL. If one or the other of these conditions is not satisfied, control passes from diamond 140 to block 145, where a color violation exception handler may be executed. For example, if both conditions are not met, a page-color violation exception may be generated, e.g. via generation of a page fault with a CV bit set. Note that in various embodiments, a proper color transition occurs when the color popped from the stack is the same as the previous color transition color (e.g., stored in the PPC register).

If at diamond 140 it is determined that a valid transition has occurred, control passes to block 150. There, the callee function may be executed on the remapped stack (block 150). Note that any additional stack pages needed during the callee's code may be allocated with the current page color. Execution of the callee function may continue until it is completed (also at block 150). When execution of the callee function is completed, and all pushes that occurred during the callee's execution are cleared (thus de-allocating any new pages allocated to the stack during callee execution), control may be prepared to pass back to the caller function. Thus, the caller's return data may be popped from the stack and control returned to the caller (block 155). Accordingly, the processor stack pointer may be replaced with the caller's version of the PSP stored on the stack. Similarly, the processor base pointer may also be restored. Note further that an instruction pointer for the caller function may further be popped from the stack. Such operations may occur atomically responsive to an inter-color return instruction, e.g., YRET.

From block 155, control passes to diamond 160, where it may be determined if the instruction causing the popping of these values is the inter-color return instruction (i.e., YRET) (diamond 160). If not, control passes to block 145 for execution of the color violation exception handler. If a valid transition is indicated to be occurring, control passes to diamond 165. There, it may be determined whether the previous instruction (i.e., of the callee function) was the inter-color return instruction and a valid color transition has occurred. If not, control passes from diamond 165 back to block 145 for execution of the color violation exception handler. In various embodiments, diamond 165 may be implemented via an inter-color transition instruction, namely YDAV.

Once control has validly returned to the caller function, the caller function may request that the CAS module unmap the allocated callee stack pages (block 170). Accordingly, further execution on the caller function may continue (block 180). While described with this particular implementation in the embodiment of FIG. 2, it is to be understood that the scope of the present invention is not limited in this regard.

In other embodiments, a handle-based approach may be used to allow color transitioning of stack pages. In such embodiments, the CAS module or another color assignment mechanism may maintain data structures (e.g., colored in the same color as that of the CAS module), and return a handle for a request by a caller to make the stack accessible to a callee. Instead of remapping the stack to a different linear address space, the CAS module may perform recoloring of the stack pages to the color of the callee and return the handle to the caller. The caller may then pass the handle as a parameter to the callee. Since the stack is colored in callee's color, the callee can access the pages. Once the callee has competed execution of its code, it then requests the CAS module to recolor the stack back to the caller's color. In one embodiment, this may be achieved by passing of the handle from the callee back the CAS module. The CAS module may then recolor the pages back to the caller's code, based on the information stored for the identified handle.

In certain implementations, the CAS module may, in its local data structures, maintain a color-transition stack to ensure that color transitions are happening in expected fashion. The color transition stack may be implemented as follows, in one embodiment. On every XCALL, the color of the caller is pushed onto this stack. On every YRET, the color from the top of the stack is popped, and compared with the color of the return address. If there is a match, the return is allowed. Otherwise, a color violation exception is raised.

In a handle-based approach, there is no remapping of stack pages or changing of stack pointers (e.g., ESP & EBP). Further, such an approach may be effective even if there are recursive calls occurring between caller and callee. The requests to the CAS module can be executed through a call gate or as an interrupt handler, causing the CAS to remain in non-paged memory, preventing any page faults.

Still further embodiments may provide for color transitions without explicit calls to the CAS module or other OS mechanism. Instead, as a last step before jumping into callee code, a caller may execute an instruction to effect recoloring of stack pages. Specifically, in one embodiment a RECOLOR instruction may be executed by the processor to change the color of stack pages to that of the callee code. To enable successful recoloring, the instruction may first confirm that the page being recolored is of the same color as that of the code that is trying to recolor it. Also, in some implementations the instruction may be used to recolor only pages that are not executable. Alternately, the RECOLOR instruction may atomically disable an execute permission on the page. Note that while such an embodiment is OS-agnostic and avoids the overhead of a CAS module, in this approach software components are solely responsible for maintaining the stack color consistency, and programming errors could lead to insecure stack handling. In yet another embodiment, the RECOLOR operation can be a part of the XCALL and/or the YRET instructions.

Figure 3:
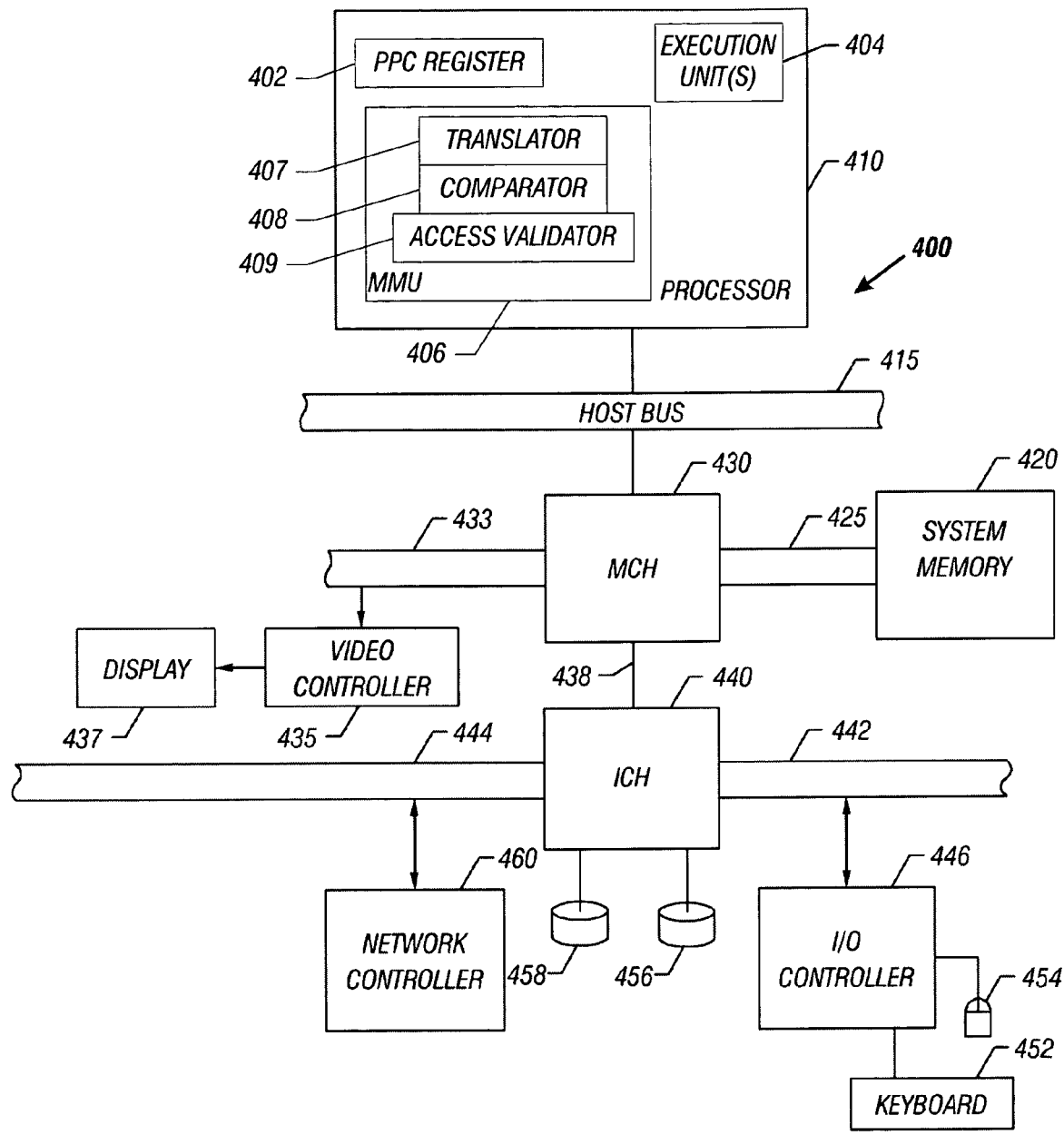
FIG. 3 is a block diagram of a system in accordance with one embodiment of the present invention.

FIG. 3 is a block diagram of a computer system 400 that may implement inter-color transitions between processes in accordance with an embodiment of the invention. As used herein, the term "computer system" may refer to any type of processor-based system, such as a server computer, a notebook computer, a desktop computer, or the like. In one embodiment, computer system 400 includes a processor 410, which may be a multicore processor.

As shown in FIG. 3, processor 410 includes a PPC register 402 to store a previous color corresponding to the color of a previously running process. Furthermore, processor 410 may include one or more execution units 404 to perform operations on data responsive to various instructions. Such execution units may include integer units, floating-point units, single instruction multiple data (SIMD) units, among others. As further shown in FIG. 3, processor 410 includes a memory management unit (MMU) 406. MMU 406 may be used to access memory using a linear address received from a process to obtain requested information from its physical location. MMU 406 may include a translator 407 which may translate linear addresses into physical addresses. Translator 407 may include, for example, a translation lookaside buffer (TLB) in addition to control logic. MMU 406 may further include a comparator 408. In various embodiments, comparator 408 may be used to compare a color of a page obtained by translator 407 and compare the color to the color of the page including the instruction that provided the linear address. Based on the comparison, the various operations disclosed herein may be performed to allow the transition, or to prevent the transition and perform an appropriate handler. MMU 406 may further include an access validator 409 that may be used to determine if a color transition as validated by comparator 408 is allowed to proceed. That is, access validator 409 may be used by a callee function to confirm that the transition from a caller function is allowed based on color of the caller and the callee. Accordingly, access validator 409 may access the previous color in PPC register 402 and compare it to a list of colors allowed to transition into the calling function. While described in the embodiment of FIG. 3 as being located in MMU 406, a translator, comparator, and access validator in accordance with an embodiment of the present invention may be located in other portions of a processor.

Processor 410 may be coupled over a host bus 415 to a memory controller hub (MCH) 430 in one embodiment, which may be coupled to a system memory 420 (e.g., a dynamic random access memory (DRAM)) via a memory bus 425. MCH 430 may also be coupled over a bus 433 to a video controller 435, which may be coupled to a display 437.

MCH 430 may also be coupled (e.g., via a hub link 438) to an input/output (I/O) controller hub (ICH) 440 that is coupled to a first bus 442 and a second bus 444. First bus 442 may be coupled to an I/O controller 446 that controls access to one or more I/O devices. As shown in FIG. 3, these devices may include in one embodiment input devices, such as a keyboard 452 and a mouse 454. ICH 440 may also be coupled to, for example, multiple hard disk drives 456 and 458, as shown in FIG. 3. Such drives may be two drives of a redundant array of individual disks (RAID) subsystem, for example. It is to be understood that other storage media and components may also be included in the system. Second bus 444 may also be coupled to various components including, for example, a network controller 460 that is coupled to a network port (not shown).

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a request from a caller code portion of a first color to color at least a portion of a stack with a second color, the stack including local state of an executing process;
   determining if the request is valid; and
   if the request is valid, making at least the portion of the stack accessible to a callee code portion of the second color.

2. The method of claim 1, further comprising making at least the portion of the stack accessible to the callee code portion by remapping the portion of the stack from a first mapping colored with the first color to a second mapping colored with the second color.

3. The method of claim 1, further comprising making at least the portion of the stack accessible to the callee code portion by changing a color of stack mapping from the first color to the second color.

4. The method of claim 2, further comprising:
   determining if a color transition from the first color to the second color is valid; and
   executing the callee code portion of the second color called by the caller code portion if the color transition is valid, otherwise executing a color violation handler.

5. The method of claim 4, further comprising pushing data associated with the caller code portion onto the stack at the second mapping.

6. The method of claim 4, wherein determining if the color transition is valid comprises determining if a first predetermined color transition instruction caused a transfer to the callee code portion and determining if a second predetermined color transition instruction of the callee code portion received control at the transfer.

7. The method of claim 4, further comprising:
   determining if a return to the caller code portion from the callee code portion was responsive to a predetermined color transition instruction of the callee code portion; and
   if so, making the portion of the stack inaccessible to the callee code portion.

8. The method of claim 7, further comprising unmapping the second mapping of the stack colored in the second color to make the portion of the stack inaccessible.

9. The method of claim 3, further comprising changing the color of stack mapping from the second color to the first color to make the portion of the stack inaccessible to the callee code portion after return to the caller code portion.

10. An apparatus comprising:
    a caller process having an attribute of a first color, the caller process including at least one first page in a memory, the at least one first page colored with the first color;
    a callee process having an attribute of a second color, the callee process including at least one second page in the memory, the at least one second page colored with the second color;
    an assignment module to assign at least a portion of a stack to the caller process and the callee process, wherein the caller process and the callee process are to dynamically share the portion of the stack; and
    the assignment module is to remap the portion of the stack from a first mapping when the caller process is active to a second mapping when the callee process is active.

11. The apparatus of claim 10, wherein the assignment module is to dynamically recolor the portion of the stack from the first color to the second color if a valid transition from the caller process to the callee process occurs.

12. The apparatus of claim 10, wherein the assignment module is to provide a handle to the caller process and to dynamically recolor the portion of the stack from the first color to the second color, and wherein the caller process is to pass the handle to the callee process.

13. The apparatus of claim 12, wherein the assignment module is to dynamically recolor the portion of the stack from the second color to the first color after receipt of the handle from the callee process.

14. The apparatus of claim 10, wherein the assignment module comprises code of the caller process, wherein the code includes an instruction that when executed enables the caller process to recolor the portion of the stack to the second color prior to a transfer of control to the callee process.

15. The apparatus of claim 14, wherein the caller process is to recolor the portion of the stack only if a current color of the portion of the stack corresponds to the first color.

16. An article comprising a machine-readable medium including instructions that when executed enable a system to:
    determine if a color change operation to change a color of a stack portion associated with a first function of a first color to a second function of a second color is permissible; and
    execute the color change operation if permissible and change a linear mapping of the stack portion from a first linear address of the first function to a second linear address of the second function, otherwise prevent the color change operation.

17. The article of claim 16, further comprising instructions that when executed enable the system to determine if a current color of the stack portion is the same as the first color, wherein the first function is to execute the color change operation.

18. The article of claim 16, further comprising instructions that when executed enable the system to provide a handle from an assignment manager to the first function and to pass the handle from the first function to the second function.

19. The article of claim 18, further comprising instructions that when executed enable the system to recolor the stack portion to the first color if the handle is received in the assignment manager from the second function.

20. The article of claim 16, further comprising instructions that when executed enable the system to create a second mapping for the first function with the second color so that the first function can access the stack portion after the color change operation.

21. A system comprising:
   an assignment module to receive a request from a first code segment having a first color for a color change operation to change a color of a stack portion from the first color to a second color, wherein the first code segment is to call a second code segment having the second color and to dynamically remap the stack portion to a linear address associated with the second code segment; and
   a dynamic random access memory (DRAM) coupled to the assignment module.

22. The system of claim 21, further comprising a processor including a first register to store a color of a previously executed code segment.

23. The system of claim 22, further comprising an access validator to determine if the color change operation is permissible based on the first color and the second color.

24. The system of claim 23, wherein the access validator is to determine that the color change operation is permissible if the first register includes a value of the first color.

25. The system of claim 21, wherein assignment module is to provide a new mapping for the first code segment to allow the first code segment to dynamically share the stack portion during execution of the second code portion.

* * * * *